United States Patent
Min et al.

(10) Patent No.: US 9,523,459 B2
(45) Date of Patent: Dec. 20, 2016

(54) VACUUM INSULATION PANEL WITH IMPROVED RUPTURING AND PREPARATION METHOD THEREOF

(71) Applicant: LG Hausys, Ltd., Seoul (KR)

(72) Inventors: Byung-Hoon Min, Busan (KR); Sung-Seock Hwang, Cheongju-si (KR); Seung-Min Jeon, Busan (KR); Jung-Pil Han, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/408,063

(22) PCT Filed: May 15, 2013

(86) PCT No.: PCT/KR2013/004296
§ 371 (c)(1),
(2) Date: Dec. 15, 2014

(87) PCT Pub. No.: WO2014/007461
PCT Pub. Date: Jan. 9, 2014

(65) Prior Publication Data
US 2015/0192238 A1 Jul. 9, 2015

(30) Foreign Application Priority Data
Jul. 3, 2012 (KR) ......................... 10-2012-0072147

(51) Int. Cl.
*F16L 59/065* (2006.01)
*F16L 59/08* (2006.01)
(Continued)

(52) U.S. Cl.
CPC .............. *F16L 59/065* (2013.01); *B32B 3/04* (2013.01); *B32B 7/12* (2013.01); *B32B 15/085* (2013.01);
(Continued)

(58) Field of Classification Search
CPC ........................... Y10T 428/231; F16L 59/065
(Continued)

(56) References Cited

U.S. PATENT DOCUMENTS

| 2003/0134078 A1 | 7/2003 | Urata et al. |
| 2006/0024469 A1 | 2/2006 | Tenra et al. |
| 2008/0286515 A1* | 11/2008 | Jung ..................... F16L 59/065 428/36.7 |

FOREIGN PATENT DOCUMENTS

| CN | 102105735 A | 6/2011 |
| EP | 1617126 A1 | 1/2006 |

(Continued)

OTHER PUBLICATIONS

International Search Report for PCT/KR2013/004296 mailed Aug. 19, 2013, citing the above reference(s).

(Continued)

*Primary Examiner* — Alexander Thomas
(74) *Attorney, Agent, or Firm* — Hauptman Ham, LLP (57) ABSTRACT

Provided is a vacuum insulation panel comprising: a core material; and a shell material for covering the core material, wherein the shell has a layered structure comprising a surface protective layer, a metal barrier layer, and a thermal deposition layer from the outside, and the sealing strength of the vacuum insulation panel is 5-15 kgf. In addition, provided is a method for preparing the vacuum insulation panel, comprising the steps of: preparing the shell material by sequentially layering the thermal deposition layer, the metal barrier layer and the surface protective layer; inserting the core material between the shell material; reducing pressure and sealing the shell material so as to form a vacuum insulation panel; and heat treating the vacuum insulation panel, wherein the sealing strength of the vacuum insulation panel is 5-15 kgf.

4 Claims, 5 Drawing Sheets (51) Int. Cl.
   *B32B 7/12*      (2006.01)
   *B32B 15/085*    (2006.01)
   *B32B 27/20*     (2006.01)
   *B32B 3/04*      (2006.01)
   *B32B 37/06*     (2006.01)
   *B32B 37/10*     (2006.01)
   *B32B 37/30*     (2006.01)
   *B32B 38/04*     (2006.01)
   *E04B 1/80*      (2006.01)

(52) U.S. Cl.
   CPC ............ *B32B 27/205* (2013.01); *B32B 37/06* (2013.01); *B32B 37/10* (2013.01); *B32B 37/30* (2013.01); *B32B 38/04* (2013.01); *F16L 59/08* (2013.01); *B32B 2038/047* (2013.01); *B32B 2307/304* (2013.01); *B32B 2307/7244* (2013.01); *B32B 2323/04* (2013.01); *B32B 2323/10* (2013.01); *E04B 1/803* (2013.01); *Y10T 156/1056* (2015.01); *Y10T 428/231* (2015.01)

(58) Field of Classification Search
   USPC .......................................................... 428/69
   See application file for complete search history.

(56) References Cited

FOREIGN PATENT DOCUMENTS

| | | |
|---|---|---|
| JP | 09286089 A | 11/1997 |
| JP | 2004011861 A | 1/2004 |
| JP | 2006118639 A | 5/2006 |
| JP | 2007138976 A | 6/2007 |
| JP | 2007239771 A | 9/2007 |
| JP | 2010090905 A | 4/2010 |
| JP | 2010091107 A | 4/2010 |
| JP | 2011089740 A | 5/2011 |
| KR | 100775716 B1 | 11/2007 |

OTHER PUBLICATIONS

Korean Office Action dated May 27, 2014, citing the above reference(s).

European Search Report dated Jun. 22, 2015 in connection with the counterpart European Patent Application No. 13813311.1, citing the above reference(s).

Chinese Office Action dated Oct. 20, 2015 in connection with the counterpart Chinese Patent Application No. 201380035665.X, citing the above reference(s).

* cited by examiner

VACUUM INSULATION PANEL WITH IMPROVED RUPTURING AND PREPARATION METHOD THEREOF

TECHNICAL FIELD

The present invention relates to a vacuum insulation panel having improved rupturing resistance, and a method for manufacturing a vacuum insulation panel, which includes heat treatment to minimize an unwelded portion of a shell.

BACKGROUND ART

In currently commercially available vacuum insulation panels, inorganic compounds, such as glass wool, fumed silica, aerogel and the like, are used as a core. In addition, nylon/PET/aluminum foil, or an aluminum deposition layer and a welding layer such as PE, PP and the like are used for a shell. Further, to secure long term performance, vacuum insulation panels include a getter such as quicklime (CaO), zeolite and the like, a moisture absorbent such as silica gel and the like, and metal powder.

However, since maintenance of an internal vacuum level is the most important factor in performance of the vacuum insulation panels, the internal vacuum level is maintained by sealing the shell at a high vacuum of 10 Pa or less. However, since an unwelded portion such as an edge of the shell is vulnerable to physical impact and thus is likely to rupture, there is difficulty handling of the vacuum insulation panel.

Korean Patent No. 10-0775716 discloses a vacuum insulation panel that is composed of a core, a getter and a shell, and has a through-hole formed therein, wherein a thermal welding portion is formed according to the core and a surrounding edge around the core is disposed as the thermal welding portion, thereby maintaining a large effective heat insulating area. However, this patent does not disclose improvement in a welding ratio of the thermal welding portion by welding an unwelded portion of the shell, such as an edge of the shell, and the like.

DISCLOSURE

Technical Problem

It is an aspect of the present invention to provide a vacuum insulation panel which is manufactured by decompression and sealing of an inside of a shell including a core inserted therein and has improved rupturing resistance by minimizing rupturing failure due to physical impact applied to the shell while increasing a welding ratio of a thermal welding portion.

It is another aspect of the present invention to provide a method for manufacturing the vacuum insulation panel as set forth above.

Technical Solution

In accordance with one aspect of the present invention, a vacuum insulation panel includes a core, and a shell covering the core, wherein the shell includes a stacked structure of a surface protective layer, a metal barrier layer and a thermal welding layer in order from an outer side thereof, and the vacuum insulation panel has a sealing strength from about 5 kgf to about 15 kgf.

The thermal welding layer may include linear low density polyethylene (LLDPE) or cast polypropylene (CPP).

The thermal welding layer may have a thickness from about 30 μm to about 80 μm.

The vacuum insulation panel may include at least one through-hole.

The through-hole may be formed in the core or in a thermal welding portion of the shell in a thickness direction thereof.

The through-hole may include a polygonal shape, a circular shape, an elliptical shape, and combinations thereof.

In accordance with another aspect of the present invention, a method for manufacturing a vacuum insulation panel includes: preparing a shell by sequentially stacking a thermal welding layer, a metal barrier layer and a surface protective layer; placing a core between the shell; forming a vacuum insulation panel by compressing and sealing the shell; and heat treating the vacuum insulation panel, wherein the vacuum insulation panel has a sealing strength from about 5 kgf to about 15 kgf.

The method may include forming a through-hole in the core before placing the core in the shell.

Heat treatment may cause an unwelded portion of the shell to be welded.

A heat source of heat treatment may be infrared radiative heat, hot air, or a heater.

Heat treatment may be performed at a temperature from about 100° C. to about 200° C. for about 1 minute to about 30 minutes.

Heat treatment may be performed at atmospheric pressure or less.

The method may further include cooling the vacuum insulation panel at a temperature from about 20° C. to about 90° C. after heat treatment.

Advantageous Effects

The vacuum insulation panel exhibits improved rupturing resistance at an edge and the like by increasing a thermal welding ratio of a thermal welding portion of a shell, and can be easily processed into various shapes.

In addition, even though a through-hole is formed in the shell excluding the core of the vacuum insulation panel, the vacuum insulation panel can maintain stability and excellent heat insulation properties.

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof. Like components will be denoted by like reference numerals throughout the specification.

Hereinafter, embodiments of the present invention will be described in detail with reference to the accompanying drawings.

Vacuum Insulation Panel

In accordance with one aspect of the present invention, a vacuum insulation panel includes a core, and a shell covering the core, wherein the shell includes a stacked structure of a surface protective layer, a metal barrier layer and a thermal welding layer in order from an outer side thereof, and the vacuum insulation panel has a sealing strength from 5 kgf to 15 kgf.

Figure 1:
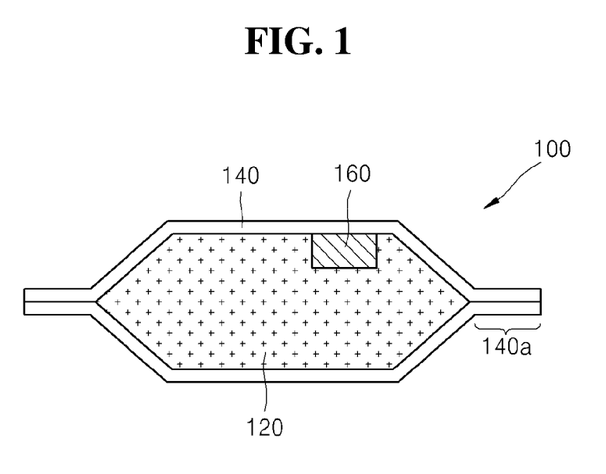
FIG. 1 is a sectional view of a vacuum insulation panel according to the present invention.

FIG. 1 shows a structure of a vacuum insulation panel subjected to heat treatment according to one embodiment of the present invention. In FIG. 1, a vacuum insulation panel 100 includes a core 120, a getter 160, and a shell 140.

The vacuum insulation panel 100 may have a sealing strength from about 5 kgf to about 15 kgf. Herein, the sealing strength refers to a bonding strength of a sealing portion when the same or different film sheets and the like of thermoplastic plastics are thermally bonded. That is, the sealing strength refers to a maximum load for separating the sealing portion when a sealed specimen is pulled until the sealing portion is broken. Unlike typical vacuum insulation panels maintaining a sealing strength of less than about 5 kgf at atmospheric pressure and at room temperature, the vacuum insulation panel according to the present invention has excellent properties in that the vacuum insulation panel exhibits higher sealing strength than existing vacuum insulation panels while maintaining sealing strength within the above range. Thus, the vacuum insulation panel has excellent advantageous effects in that the vacuum insulation panel can maintain an internal vacuum even when the shell is shrunk due to a difference between internal pressure thereof and atmospheric pressure, and can be processed into various shapes.

The core 120 may be formed of any core materials known in the art, such as glass wool, glass boards, perlite, fumed silica, aerogel, and the like, so long as the core material exhibits heat insulation properties. Specifically, the core 120 may be formed by stacking at least one layer of glass fibers stirred in an aqueous solution which does not include an organic/inorganic binder or includes water or an organic compound, and may be formed by stacking at least one glass fiber aggregate having a diameter from about 1 μm to about 10 μm or by stacking at least one layer of glass wools including organic/inorganic binders and a board.

The vacuum insulation panel 100 may further include the getter 160 for the purpose of moisture absorption inside thereof. When used, the getter 160 is attached to the core or inserted into the core. FIG. 1 shows one embodiment in which the getter is inserted into the core.

The getter 160 may include quicklime (CaO) powder having a purity of 95% or more, and may include at least one selected from among zeolite, cobalt, lithium, activated carbon, aluminum oxide, barium, calcium chloride, magnesium oxide, magnesium chloride, iron oxide, zinc, and zirconium.

Figure 2:
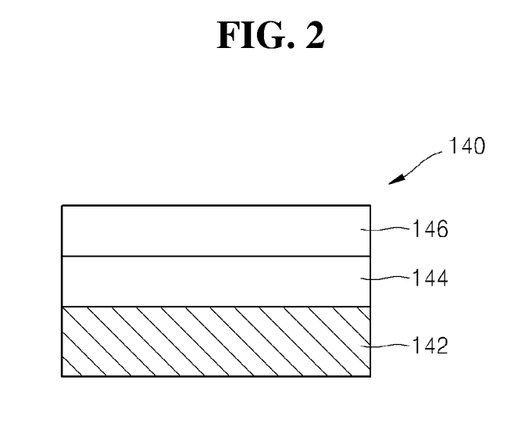
FIG. 2 is a sectional view of a shell of a vacuum insulation panel according to the present invention.

FIG. 2 shows a shell of a vacuum insulation panel according to another embodiment of the present invention, and a shell 140 includes a surface protective layer 146, a metal barrier layer 144, and a thermal welding layer 142 in order from an outer side thereof.

The surface protective layer 146 serves to protect a surface of the vacuum insulation panel or the core inside the vacuum insulation panel from external impact by absorption and dispersion of the external impact. Thus, the surface protective layer 146 may be formed of a material exhibiting excellent impact resistance.

A material of the surface protective layer 146 may include polycarbonate, polyimide, nylon, polyethylene terephthalate (PET), and 100 nm or less thick aluminum-deposited VM-PET and K-PET films. The surface protective layer may be a stack body of at least one selected from among these films. As a specific example, the surface protective layer 146 may be formed by bonding a nylon film and a PET film.

The metal barrier layer 144 is bonded to a lower side of the surface protective layer 146, and serves to maintain an internal vacuum level and to block inflow of external gas, moisture and the like.

A material for the metal barrier layer 144 includes an aluminum foil (Al foil) exhibiting excellent barrier properties, and may be an aluminum foil containing about 0.65% by weight (wt %) or less of iron (Fe) among aluminum foils. An aluminum foil containing greater than about 0.65 wt % of iron (Fe) is disadvantageous due to much higher increase in production cost than improvement in barrier properties thereof.

If the aluminum foil is torn, the vacuum insulation panel can exhibit deterioration in long-term durability due to penetration of gas, moisture and the like through the tear. Thus, according to the present invention, to supplement barrier properties of the aluminum foil, the surface protective layer 146 may be formed by bonding a PET film or an ethylene vinyl alcohol (EVOH) film to the aluminum foil.

The thermal welding layer 142 is bonded to a lower side of the metal barrier layer 144 and is brought into tight contact with a surface of the core of the vacuum insulation panel. The thermal welding layer 142 may be formed of a film made of a material, such as linear low density polyethylene (LLDPE), low density polyethylene (LDPE), high density polyethylene (HDPE), cast polypropylene (CPP) and the like, which can be easily subjected to thermal welding and exhibit excellent sealing properties. These materials may be used alone or in combination thereof.

The thermal welding layer 142 of the shell 140 plays a major role in sealing of the vacuum insulation panel or a thermal welding portion 140a of the shell and can influence sealing strength of the vacuum insulation panel according to the present invention. Therefore, since the thermal welding layer 142 of the shell 140 may include linear low density polyethylene (LLDPE) or cast polypropylene (CPP), the thermal welding layer 142 can be bonded better, thereby maintaining the sealing strength of the vacuum insulation panel in the range of about 5 kgf to about 15 kgf.

In addition, since LLDPE and CPP advantageously allow the thermal welding layer to be easily bonded, sealing of the thermal welding layer can be maximized by limiting the thermal welding layer 142 to LLDPE or CPP, thereby allowing an unwelded portion of the shell to be welded. Therefore, the vacuum insulation panel can maintain the sealing strength thereof in the range of about 5 kgf to about 15 kgf.

More specifically, the thermal welding layer 142 may have a thickness from about 30 μm to about 80 μm. The thickness of the thermal welding layer 142 may range from about 30 μm to about 80 μm in consideration of minimization of gas permeability by the thermal welding layer, sealing strength, and optimization of initial performance of the vacuum insulation panel.

Since the vacuum insulation panel can secure durability from a portion of the core including the shell to the thermal welding portion 140a of the shell and does not suffer from rupturing by maintaining the sealing strength in the range of about 5 kgf to about 15 kgf, the vacuum insulation panel may include at least one through-hole 150.

The through-hole 150 may be formed in the core 120 or in the thermal welding portion 140a of the shell 140 in a thickness direction thereof. That is, the through-hole may be formed in the thermal welding portion of the shell including the core or in the thermal welding portion of the shell not including the core. Here, the through-hole may include a polygonal shape, a circular shape, an elliptical shape, and combinations thereof.

Figure 3A:
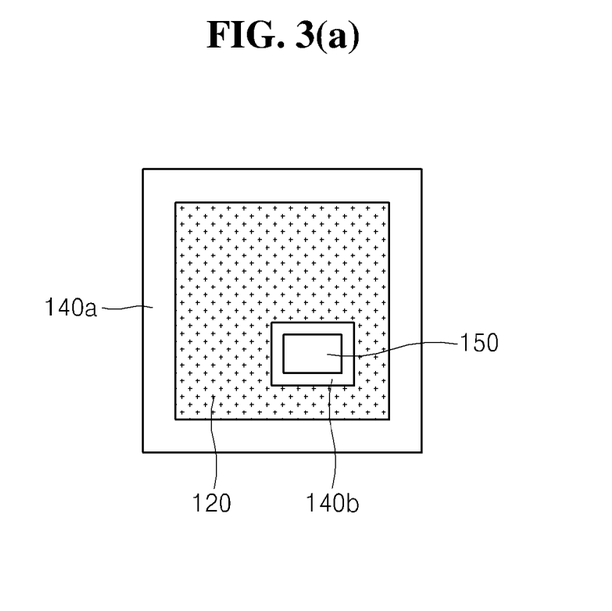
FIGS. 3a and 3b shows plan views of vacuum insulation panels including through-holes according to embodiments of the present invention.

FIG. 3 shows plan views of the vacuum insulation panels including the through-hole. In FIG. 3(a), the core 120 includes the through-hole 150 in a right lower portion thereof, and the through-hole 150 included in the core 120 is wrapped with the shell. Since the vacuum insulation panel according to the present invention maintains the sealing strength in the range of 5 kgf to 15 kgf, a certain level of sealing strength can be maintained in a thermal welding portion 140b inside the through-hole as well as in a thermal welding portion 140a outside the shell. Therefore, the vacuum insulation panel can maintain constant durability regardless of the presence of the through-hole 150 and thus does not suffer from rupturing.

Figure 3B:
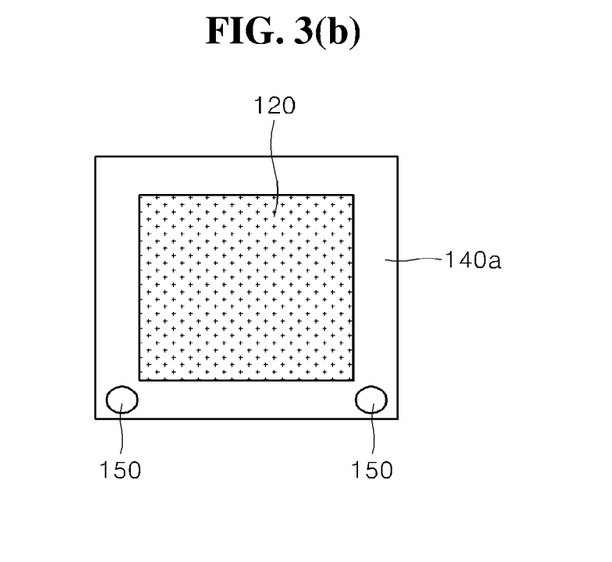

Typical vacuum insulation panels do not maintain durability of the thermal welding portion of the shell due to low sealing strength, and suffer from tearing and rupturing of the thermal welding portion 140a when processed to form the through-hole 150 or processed into various shapes. However, since the vacuum insulation panel secures a certain level of sealing strength and thus allows firm welding of the thermal welding portion 140a of the shell 140 even though the circular through-holes 150 are formed in the thermal welding portion 140a of the shell 140, as shown in FIG. 3(b), the vacuum insulation panel does not suffer from tearing and rupturing due to the through-hole 150.

Figure 4A:
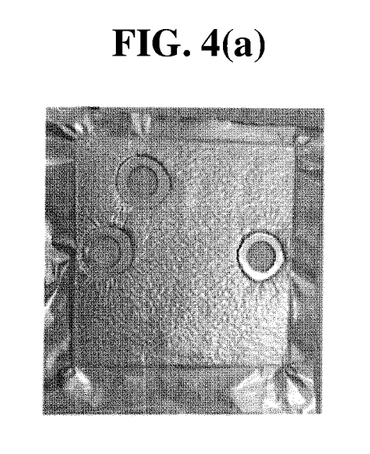
FIGS. 4a and 4b shows pictures showing actual shapes of vacuum insulation panels according to embodiments of the present invention.
Figure 4B:
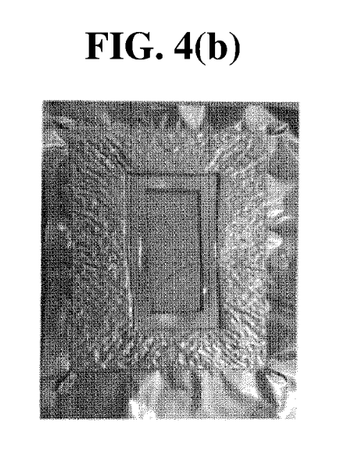

FIG. 4 shows pictures of actual shapes of vacuum insulation panels including through-holes. FIG. 4(a) shows a vacuum insulation panel including circular through-holes formed in a core in a thickness direction thereof, and FIG. 4(b) shows a vacuum insulation panel including a quadrangular through-hole formed in a core in a thickness direction thereof.

Method for Manufacturing Vacuum Insulation Panel

In accordance with another aspect of the present invention, a method for manufacturing a vacuum insulation panel includes: preparing a shell by sequentially stacking a thermal welding layer, a metal barrier layer and a surface protective layer; placing a core between the shell; forming a vacuum insulation panel by compressing and sealing the shell; and heat treating the vacuum insulation panel, wherein the vacuum insulation panel has a sealing strength from 5 kgf to 15 kgf.

In the method for manufacturing a vacuum insulation panel, the organic/inorganic core is placed in the shell, followed by 4-side sealing or T-sealing of the shell in a high vacuum, thereby manufacturing a vacuum insulation panel. Here, a thermal welding portion of the shell of the vacuum insulation panel is first sealed through first 4-side sealing or T-sealing and a difference between internal pressure of the shell and external pressure thereof, that is, atmospheric pressure, is reduced upon decompression of the shell to a high vacuum level, thereby allowing an unwelded portion of the shell, which is not sealed upon first sealing, to be welded.

Since the manufacturing method includes heat treatment of the vacuum insulation panel subjected to first sealing with the shell including an organic material in the thermal welding layer, the thermal welding portion such as an edge of the shell can be firmly welded, and the vacuum insulation panel can maintain constant sealing strength and exhibit improved durability.

Heat treatment of the vacuum insulation panel causes the unwelded portion of the shell to be welded. The vacuum insulation panel, which is manufactured by decompression and sealing of the shell receiving the core therein, is subjected to heat treatment once again, thereby welding the unwelded portion of the thermal welding portion, which is not sealed due to the pressure difference between the inside and the outside of the shell. According to the present invention, the unwelded portion refers to a portion of the thermal welding layer of the shell, which is not sealed, and the thermal welding portion 140a may correspond to the unwelded portion.

As such, the first sealed vacuum insulation panel is subjected to heat treatment once again, thereby welding the unwelded portion generated by the pressure difference between the inside and the outside of the shell.

As a result, the thermal welding portion of the shell is sealed once again through sealing due to heat treatment, and the vacuum insulation panel maintains an internal vacuum level, thereby securing a certain level of durability due to the shell formed by resealing of the unwelded portion. Thus, the vacuum insulation panel can be processed into various shapes and prevented from tearing or rupturing.

The method may include forming a through-hole in the core before placing the core in the shell. If the through-hole is formed after the core is placed in the shell, as in the case of formation of the through-hole in the completed vacuum insulation panel, the vacuum insulation panel can suffer from rupturing upon formation of the through-hole and thus does not secure heat insulation properties. Therefore, the through-hole is formed before the core is placed in the shell, thereby providing the vacuum insulation panel including the through-hole having various shapes.

According to the present invention, the method for manufacturing a vacuum insulation panel allows the unwelded portion of the shell to be welded through heat treatment, and a heat source of heat treatment may include infrared radiative heat, an electric hot air blower, or a heater. Although the heat source of heat treatment allowing the unwelded portion of the shell to be welded may be any heat source, the heat source may be an electric hot air blower such that an overall temperature of the vacuum insulation panel can be uniformly adjusted.

Heat treatment is performed at a temperature from about 100° C. to about 200° C. Within this range, there is an advantage in that the unwelded portion is easily welded. More specifically, when the temperature for heat treatment is adjusted from about 130° C. to about 150° C., there is an advantage in that the vacuum insulation panel maintains initial performance thereof and is prevented from deterioration in basic properties of the shell thereof.

Heat treatment is performed for about 1 minute to about 30 minutes, and heat treatment for about 3 minutes to about 10 minutes is advantageous in that the vacuum insulation panel maintains sealing strength and is prevented from deterioration in basic properties of the shell. Specifically, within this range, it is possible to mitigate drawbacks, such as rupturing of the unwelded portion of the vacuum insulation panel due to physical impact, and the like.

In addition, heat treatment is performed at atmospheric pressure or less. Specifically, when heat treatment is performed at 1 atmosphere or less, the manufactured vacuum insulation panel can maintain an internal vacuum and the unwelded portion can be easily welded.

In another embodiment, the method may further include cooling the vacuum insulation panel after heat treatment of the vacuum insulation panel manufactured by placing the core in the shell having a stacked structure of the surface protective layer, the metal barrier layer and the thermal welding layer in order from an outer side thereof, followed by decompression and sealing of the inside of the shell.

Cooling is performed to stabilize the shell of the vacuum insulation panel subjected to heat treatment. Due to cooling of the heat treated vacuum insulation panel, the thermal welding portion 140a, in which the unwelded portion of the shell is welded, can further secure durability, and the vacuum insulation panel can be processed into various shapes without tearing or rupturing. If the method does not include cooling of the heat treated vacuum insulation panel, since air and the like can flow into the vacuum insulation panel through the thermal welding portion which can be affected by external physical impact, there is a concern of deterioration in initial performance of the vacuum insulation panel.

Cooling may be performed at a temperature from about 20° C. to about 90° C. Cooling may be performed at any temperature and may be performed at a lower temperature than a temperature at which heat treatment is performed. More specifically, when cooling is performed under these conditions, there is an advantage in that the thermal welding portion does not suffer from deterioration in basic properties.

Hereinafter, the present invention will be described in more detail with reference to some examples. It should be understood that these examples are provided for illustration only and are not to be construed in any way as limiting the present invention.

EXAMPLES AND COMPARATIVE EXAMPLES

Example 1

To evaluate the vacuum insulation panel according to the present invention, 10 g of calcium oxide was inserted into a core in which glass boards woven from glass fibers having a diameter of 6 μm were stacked in two or more layers. Next, the core and a getter were wrapped with a shell, followed by compression and sealing.

The shell included a 50 μm thick LLDPE layer as a thermal welding layer, a 6 μm thick aluminum foil layer as a metal barrier layer, a 25 μm thick nylon film as a first protective layer, and an about 12 μm thick polyvinylidene chloride (PVDC)-coated polyethylene terephthalate (K-PET) film as a second protective layer.

The vacuum insulation panel, which was obtained by wrapping the core with the shell, followed by compression and sealing of the shell, was subjected to heat treatment at 130° C. for 10 minutes using an electric hot air blower. A 1 mm diameter hole was drilled in a thermal welding portion at an edge of the shell of the vacuum insulation panel, followed by measurement of thermal conductivity. As a result, the vacuum insulation panel had a thermal conductivity of 2.54 mW/mK.

Example 2

A quadrangular through-hole having a size of 40 mm×50 mm (width×length) was formed in a lower end portion of a core, followed by placing the core in a shell, thereby manufacturing a vacuum insulation panel. Here, the shell and a getter were the same as the shell and the getter of Example 1, respectively, and heat treatment was also performed in the same manner as in Example 1. After heat treatment, the shell inside the through-hole was cut to a size of 30 mm×40 mm (width×length), followed by measurement of thermal conductivity. As a result, the vacuum insulation panel had a thermal conductivity of 2.57 mW/mK.

Comparative Example 1

A vacuum insulation panel was manufactured in the same manner using the same core, shell and getter as in Example 1 except for heat treatment. As a result of measurement of thermal conductivity of the vacuum insulation panel, the vacuum insulation panel had a thermal conductivity of 2.55 mW/mK.

Comparative Example 2

A vacuum insulation panel was manufactured in the same manner using the same core, shell and getter as in Example 1 except for heat treatment. Here, as a result of drilling a 1 mm diameter hole in the thermal welding portion at the edge of the shell of the vacuum insulation panel, it was confirmed that the vacuum insulation panel suffered from rupturing.

Comparative Example 3

A vacuum insulation panel was manufactured in the same manner using the same core, shell and getter as in Example 2 except for heat treatment. Here, the shell inside the through-hole was cut to a size of 30 mm×40 mm (width×length), and as a result, it was confirmed that the vacuum insulation panel suffered from rupturing.

TABLE 1

|  | Example 1 | Example 2 | Comparative Example 1 | Comparative Example 2 | Comparative Example 3 |
| --- | --- | --- | --- | --- | --- |
| Heat treatment Performed/Not performed | Performed | Performed | Not performed | Not performed | Not performed |
| Hole Presence/None | In thermal welding portion of shell | In lower end portion of vacuum insulation panel | None | In thermal welding portion of shell | In lower end portion of vacuum insulation panel |

TABLE 1-continued

|  | Example 1 | Example 2 | Comparative Example 1 | Comparative Example 2 | Comparative Example 3 |
|---|---|---|---|---|---|
| Thermal conductivity (mW/mK) | 2.54 | 2.57 | 2.55 | Rupturing | Rupturing |

Referring to Table 1, even though the vacuum insulation panel of Example 1 included the circular through-hole in the thermal welding portion at the edge of the shell and the vacuum insulation panel of Example 2 included the quadrangular through-hole in the lower end portion of the vacuum insulation panel including the core, the vacuum insulation panels did not suffer from tearing and rupturing. In addition, since the vacuum insulation panels of Examples maintained a similar level of thermal conductivity to that of Comparative Example 1, which was not subjected to heat treatment, it was confirmed that heat treatment did not have an adverse influence on heat insulation properties of the vacuum insulation panels of Examples, and that the vacuum insulation panels of Examples still secured a certain level of heat insulation.

The reason being that, since the vacuum insulation panels of Examples 1 and 2 were subjected to heat treatment at a temperature from about 100° C. to about 200° C. for about 1 minute to about 30 minutes, an unwelded portion of the shell was precisely welded, thereby improving durability of the thermal welding portion of the shell and durability of the vacuum insulation panel itself. Thus, it could be seen that the heat treated vacuum insulation panel could be subjected to insertion of the through-hole and processed into various shapes.

On the contrary, the vacuum insulation panels of Comparative Examples 2 and 3 manufactured without heat treatment did not secure durability due to the presence of the unwelded portion of the shell, and suffered from rupturing and tearing despite including the through-holes at the same positions as in Examples 1 and 2, respectively.

Experimental Example

Sealing Strength of Vacuum Insulation Panel

Figure 5:
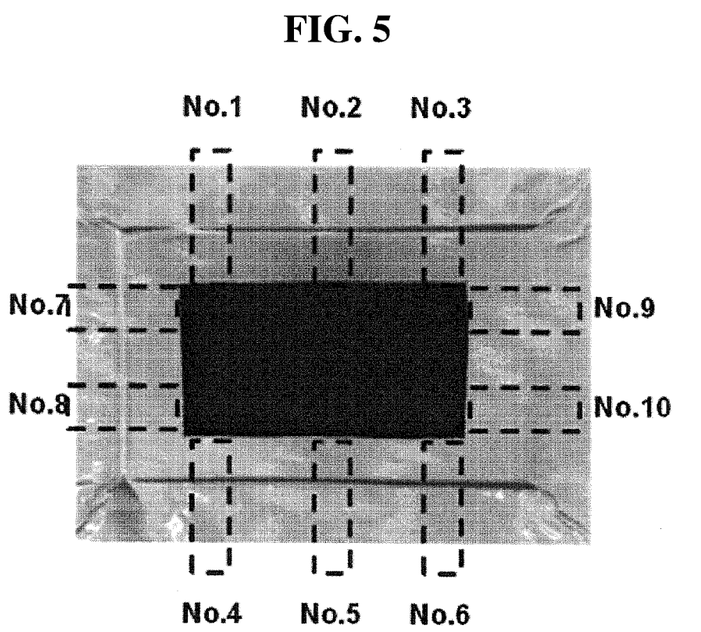
FIG. 5 is a plan view showing each point for measurement of sealing strength in vacuum insulation panels of Example 1 and Comparative Example 2.

Sealing strength of each of the vacuum insulation panels prepared in Example 1 and Comparative Example 2 was measured. As shown in FIG. 5, a sample of the thermal welding portion was cut to a width of 15 mm, a length of 10 mm and a total length of 50 mm at each of No. 1 to No. 10 positions. The sample was mounted on a tensile tester (Universal Testing Machine (5TON), Shimadzu Co., Ltd.) such that a sealing portion could be subjected to 180° peeling in a vertical direction, followed by measuring strength when the sealing portion was peeled off under a load cell of 50 kgf. Average values of sealing strength were calculated and shown in Table 2.

TABLE 2

|  | Measured result of sealing strength of specimen of Example 1 (kgf) | Measured result of sealing strength of specimen of Comparative Example 2 (kgf) |
|---|---|---|
| No. 1 | 12.8 | 5.0 |
| No. 2 | 11.7 | 4.2 |
| No. 3 | 10.7 | 5.0 |
| No. 4 | 11.8 | 5.3 |
| No. 5 | 10.8 | 5.3 |
| No. 6 | 14.2 | 4.8 |
| No. 7 | 12.0 | 4.7 |
| No. 8 | 13.0 | 5.4 |
| No. 9 | 12.0 | 4.6 |
| No. 10 | 11.9 | 4.1 |
| Average | 12.1 | 4.84 |

Referring to Table 2, the vacuum insulation panel of Example 1 had an average sealing strength of 10 kgf or more and had a sealing strength of 5 kgf or more at all of No. 1 to No. 10 positions shown in FIG. 5. The reason being that, since the unwelded portion of the shell in the vacuum insulation panel of Example 1 was strongly thermally welded due to the presence of strong physical force caused by a difference between internal pressure of the vacuum insulation panel (10 Pa or less) and atmospheric pressure (101325 Pa) through heat treatment as compared with the vacuum insulation panel of Comparative Example 2, the unwelded portion of the shell was firmly welded, thereby improving durability of the vacuum insulation panel of Example 1.

On the other hand, the vacuum insulation panel of Comparative Example 2 had an average sealing strength of less than 5 kgf and had a sealing strength of less than 5 kgf at all of No. 1 to No. 10 positions shown in FIG. 5, that is, a lower sealing strength than that of Example 1. The reason being that, since the thermal welding portion was welded only by physical force and an instantaneous heat source at atmospheric pressure without heat treatment of the vacuum insulation panel of Comparative Example 2 after manufacture thereof, the vacuum insulation panel of Comparative Example 2 did not obtain an effect of welding of the unwelded portion of the shell once again.

The invention claimed is:
1. A vacuum insulation panel comprising:
a core;
a shell covering the core,
wherein the shell comprises a stacked structure of a surface protective layer, a metal barrier layer and a thermal welding layer in order from an outer side thereof, and the vacuum insulation panel has a sealing strength from 10 kgf to 15 kgf, and
the thermal welding layer includes at least one through-hole extending therethrough in a thickness direction thereof, without extending into the core.
2. The vacuum insulation panel according to claim 1, wherein the thermal welding layer comprises linear low density polyethylene (LLDPE) or cast polypropylene (CPP).

3. The vacuum insulation panel according to claim 1, wherein the thermal welding layer has a thickness from 30 μm to 80 μm.

4. The vacuum insulation panel according to claim 1, wherein the through-hole comprises a polygonal shape, a circular shape, an elliptical shape, and combinations thereof.

* * * * *